United States Patent
Liang et al.

(10) Patent No.: US 10,693,550 B2
(45) Date of Patent: Jun. 23, 2020

(54) ENHANCED CUSTOMER PREMISE EQUIPMENT

(71) Applicants: Ping Liang, Newport Coast, CA (US); Boyu Li, Irvine, CA (US)

(72) Inventors: Ping Liang, Newport Coast, CA (US); Boyu Li, Irvine, CA (US)

(73) Assignee: RF DSP Inc., Irving, CA (US)

( * ) Notice: Subject to any disclaimer, the term of this patent is extended or adjusted under 35 U.S.C. 154(b) by 0 days.

(21) Appl. No.: 16/214,077

(22) Filed: Dec. 9, 2018

(65) Prior Publication Data

US 2019/0181940 A1 Jun. 13, 2019

Related U.S. Application Data

(60) Provisional application No. 62/596,920, filed on Dec. 11, 2017.

(51) Int. Cl.
| | |
|---|---|
| *H04L 12/28* | (2006.01) |
| *H04B 7/06* | (2006.01) |
| *H04L 5/00* | (2006.01) |
| *H04W 16/28* | (2009.01) |
| *H04B 7/0408* | (2017.01) |
| *H04B 7/0452* | (2017.01) |

(52) U.S. Cl.
CPC ......... *H04B 7/0695* (2013.01); *H04B 7/0408* (2013.01); *H04B 7/0617* (2013.01); *H04L 5/0023* (2013.01); *H04W 16/28* (2013.01); *H04B 7/0452* (2013.01)

(58) Field of Classification Search
None
See application file for complete search history.

(56) References Cited

U.S. PATENT DOCUMENTS

| | | | |
|---|---|---|---|
| 2011/0182174 A1* | 7/2011 | Pi | H04W 88/10 370/229 |
| 2017/0317866 A1* | 11/2017 | Stirling-Gallacher | H04B 7/088 |
| 2017/0359106 A1* | 12/2017 | John Wilson | H04B 7/0408 |
| 2018/0049154 A1* | 2/2018 | Choi | H04W 16/28 |

(Continued)

OTHER PUBLICATIONS

T. S. Rappaport et al., "Millimeter Wave Mobile Communications for 5G Cellular: It Will Work!" IEEE Access, vol. 1, pp. 335-349, 2013.

(Continued)

*Primary Examiner* — Elisabeth Benoit Magloire
(74) *Attorney, Agent, or Firm* — Guosheng Wang; United States Research and Patent Firm

(57) ABSTRACT

This invention presents a millimeter wave (mmWave) Customer Premise Equipments (CPEs) employing a forward processing equipment, such as a small cell, a decode-and-forward repeater, an amplify-and-forward repeater, etc., that is able to simultaneously serving its local customer premise and another or other mmWave CPEs; and a method for a Base-Station (BS) to provide mmWave backhaul links to multiple mmWave CPEs where a mmWave CPE within the Line-of-Sight (LoS) coverage of the BS is directly served by the BS in one set of time-frequency-spatial resources, while a mmWave CPE out of the LoS coverage of the BS is served by another a mmWave CPE within or out of the LoS coverage of the BS in another set of time-frequency-spatial resources.

17 Claims, 5 Drawing Sheets

(56) References Cited

U.S. PATENT DOCUMENTS

2019/0182816 A1* 6/2019 Choe ............... H04W 72/046
2019/0215045 A1* 7/2019 Choi ............... H04B 7/0617
2020/0031818 A1* 1/2020 Duan ............... C25D 3/60

OTHER PUBLICATIONS

S. Rangan et al., "Millimeter-Wave Cellular Wireless Networks: Potentials and Challenges," Proceedings of the IEEE, vol. 102, No. 3, pp. 366-385, Mar. 2014.

* cited by examiner

ENHANCED CUSTOMER PREMISE EQUIPMENT

FIELD OF INVENTION

This invention relates generally to a centimeter wave or millimeter wave customer premise equipment for wireless communication with enhanced functions.

BACKGROUND

With the continued development of wireless technology and wireless applications, the demand for faster mobile data rate keeps increasing rapidly, particularly for indoor users. To provide indoor data services, a Customer Premise Equipment (CPE) such as a router or a modem is commonly deployed for an indoor customer.

A conventional wire-backhauled CPE is deployed indoor to provide wireless or wired data services to a Local Area Network (LAN) of an indoor customer, and connects to the data network of an Internet Service Provider (ISP) through an optical fiber or cable connection. Unfortunately, the need of an optical fiber or cable connection to every wired CPE significantly increases the network deployment cost of an ISP.

An alternative device is a wireless-backhauled CPE. Instead of an optical fiber or cable connection for a wire-backhauled CPE, a wireless CPE has a wireless connection to a base station (BS) of an ISP where the BS provides a wireless backhaul connection to the wireless CPE. In sub 6-GHz frequency bands, the wireless-backhauled CPE can be deployed indoor, or the link antenna or antennas of the wireless-backhauled CPE can be deployed outdoor in order to achieve a stronger backhaul link with the BS. Unfortunately, the sub 6-GHz frequency bands widely used in wireless systems today is quite crowded, so conventional means using these frequency bands may not be sufficient to meet the growing data demand, as shown in "Millimeter Wave Mobile Communications for 5G Cellular: It Will Work!" by T. S. Rappaport et al. published in *IEEE Access*, vol. 1, pp. 335-349, 2013 (Rappaport et al 2013).

Exploiting the much broader available spectrum of centimeter and millimeter wave above 6-GHz, e.g., 28 GHz, 60 GHz, or even higher bands, has been considered as a promising solution to overcome the global spectrum shortage challenge of the upcoming Fifth Generation (5G) wireless systems (Rappaport et al 2013). For the sake of simplicity, all frequency bands of centimeter and millimeter or even shorter wavelength are all referred to millimeter wave (mmWave) hereafter.

The large bandwidth of a mmWave system could provide high data rate services, which is well suited for a wireless-backhauled CPE. However, the coverage of a mmWave BS is limited by its strong propagation directivity, large propagation loss, and high sensitivity to blockage, as shown in "Millimeter-Wave Cellular Wireless Networks: Potentials and Challenges," by S. Rangan et al. published in *Proceedings of the IEEE*, vol. 102, no. 3, pp. 366-385, March 2014. As a result, even deploying the link antenna array or antenna arrays that offer high array gain outdoor facing the BS, the working location of a mmWave CPE (mmCPE) is still limited to the Line-of-Sight (LoS) coverage area of the BS. FIG. 1 illustrates a simple example where one mmWave BS 1 serves one mmCPE 2 for one Customer Premise (CP) 3 in its LoS coverage while cannot serve another mmCPE for another CP out of its LoS coverage blocked by one obstacle 4. In this example, both CP1 and CP2 need data service using mmCPE1 and mmCPE2, but only CP1 is in the LoS coverage area of the BS, while CP2 that is blocked by the obstacle hence out of its LoS coverage area. As a result, the BS can only serve CP1 through mmCPE1, but cannot serve CP2 due to the large blockage loss in mmWave systems. In order to offer services to CP2, either another BS is deployed to provide LoS coverage to CP2, or an optical fiber or cable backhaul link needs to be deployed for CP2. Unfortunately, both methods increase the network deployment cost.

This invention provides a method and apparatus for a mmWave BS to effectively serve mmCPEs out of its LoS coverage area by employing Enhanced mmCPEs (EmmCPEs).

BRIEF DESCRIPTION OF DRAWINGS

Abbreviations used in the following list of drawings are defined in the next section which provides the detailed description of the embodiments of the invention.

DETAILED DESCRIPTION OF PREFERRED EMBODIMENTS

Figure 1:
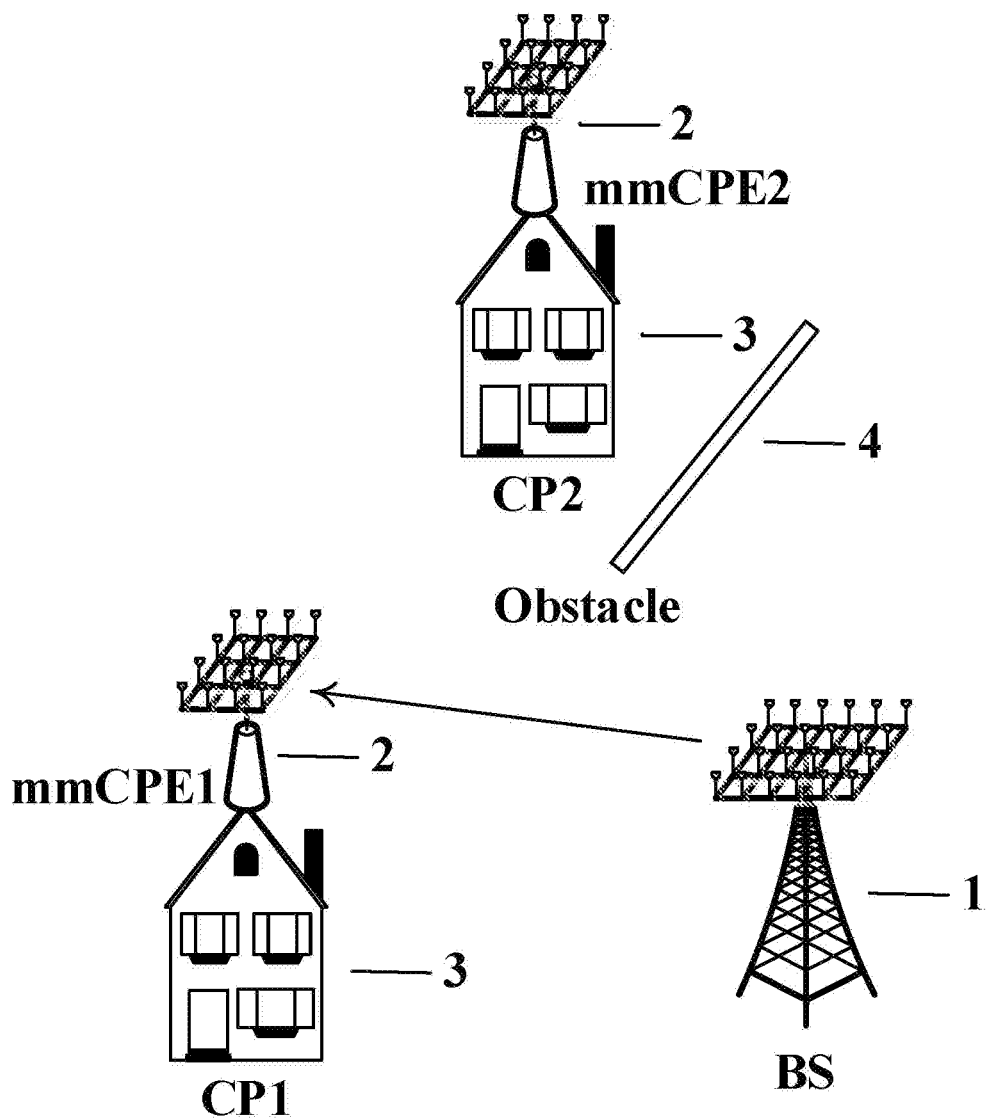
FIG. 1 shows a simple example in which one mmWave BS serves one mmCPE for one CP in its LoS coverage while cannot serve another mmCPE for another CP out of its LoS coverage blocked by one obstacle.

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof.

In the following descriptions, an antenna and a Radio Frequency (RF) path is used interchangeably to indicate a Transmit (Tx) or Receive (Rx) RF circuit and an antenna connected to it unless indicated by the context otherwise. For example, in a hybrid beamforming system, one RF path may be connected to multiple antenna elements via a beamforming circuit, mostly analog. In such a system, all the antenna elements connected to the same RF path can be treated as a single equivalent antenna in the baseband processing. Hereafter, a pilot signal may mean a signal transmitted by one antenna for the purpose of estimating the channel between the transmitting antenna and one or more receiving antennas. It may also be called a reference signal, a channel estimation signal, or a test signal.

One embodiment uses spatially distributed, digitally controlled, single-band-to-single-band or single-band-to-multi-band smart mmWave repeaters, referred to as Distributed Wireless Smart Antennas (DWSAs) which are equipped with beam-steering antennas to serve UEs in the coverage areas of the DWSAs. In the case single-band-to-single-band CBS-DWSA link, the connection between the backhauled Central Base Station CBS uses a mmWave wireless band with total bandwidth of BW, e.g., on one spatial beam out of the CBS for each DWSA, and the DWSA-UE link can support one mmWave band, e.g., on one spatial beam out of the DWSA, with a bandwidth smaller than or equal to BW. In the case single-band-to-multi-band BS-DWSA link, the connection between the CBS uses mmWave wireless band(s) with total bandwidth of N·BW, e.g., on one spatial beam out of the CBS for each DWSA, and the DWSA-UE link can support N mmWave bands, e.g., N spatial beams out of the DWSA with one band on each spatial beam, each of the band or beam has a bandwidth 1·BW, or n<N DSWA-UE bands/beams, each of which uses different frequency band and the sum of the bandwidth of all the DSWA-UE bands/beams is smaller or equal to N·BW. The frequency bands used for the CBS-DWSA link and the DWSA-UE link can be the same or different. In the case of the same band is used, the DWSA uses a directional antenna for the UEs where the direction of the CBS-DWSA beam and the DWSA-UE beam are sufficiently separated so that there is sufficient RF isolation to reduce the self-interference. Any remaining self-interference can be canceled using interference cancelation circuits that samples the transmitted signal to generate a cancelation signal to be added to the received signal. This further reduces the self-interference.

The CBS includes a base band unit (BBU) and a radio unit (RU) where the radio processing and base band processing of all the UE signals are performed. The CBS manages and coordinates all the DWSAs to better serve all the UEs. Each DWSA comprises of an antenna, antenna array or electromagnetic wave lens with mmWave waveguides or probes (all referred to as antenna) for the CBS-DWSA wireless link; an antenna for the DWSA-UE wireless links, which can be the same as or different from the antenna for the CBS-DWSA wireless link; and RF circuit primarily consisting of amplifiers connecting the CBS-DWSA antenna and DWSA-UE antenna. The RF circuit may further consist of filters, and frequency mixers or shifters to shift the frequency band from the band of the wireless link on one side to the frequency band of the wireless link on the other side. It may further consist of self-interference cancelation circuit if the same frequency band is used on both sides of the wireless links.

In one embodiment, the BBU and RU at the CBS beamforms to the DWSAs using multi-user MIMO (MU-MIMO) so that the same frequency band can be spatially multiplexed to serve a plural of DWSAs. Beam alignment and channel estimation is performed to increase the throughput of the plural of CBS-DWSA wireless links. Furthermore, the CBS performs MU-MIMO spatial multiplexing with a plural UEs with the associated DWSAs included as part of the RF channel between the CBS and the UEs. This is referred to as DWSA Pass-Through Beamforming (PTB). PTB reduces inter-DWSA and/or inter-UE interference. The CBS manages or controls the beam alignment of the DWSAs and the UEs and perform channel estimation of the total channel between the CBS and the UEs to increase the throughput of the plural of total CBS-UE wireless links. Instead of PTB, because the CBS can obtain information of all the DWSAs, the CBS can coordinate the beam directions of multiple DWSAs to reduce interference among the DWSAs. In one embodiment, the CBS pools processing and/or spectrum resources and can allocate the available bandwidth among a plural of CBS-DWSA wireless links and/or among DWSA-UE/CPE wireless links to meet the distribution of the throughput demand of the UEs. This embodiment is a new type of fronthaul as the signals on the multiple spatially multiplexed beams between the CBS and the DWSAs are not digital IQ signals as in conventional fronthaul. Instead, they are RF signals to be transmitted and pass-through-beamformed to the UEs over the CBS-DWSA-UEs channels, with one or more carrier frequency shift operations at a DWSAs if different frequency bands are used for the wireless link between the CBS and the DWSA and the wireless link between the DWSA and the UEs. The UEs are served through the DWSAs by the CBS using PTB. In this embodiment, we say that the CBS uses MU-MIMO RF-over-RF-fronthaul (RR-fronthaul) for the wireless link between the CBS and the DWSA. The DWSAs amplify the RF signals, shift carrier frequency if needed, and may also use filters to suppress out-band signals. When the same frequency band is used for the RR-fronthaul and the DWSA-UE wireless links, a DWSA can use one directional antenna or beam direction(s) of the same antenna or antenna array for the RR-fronthaul, and a different directional antennas or different beam direction(s) of the same antenna or antenna array for the DWSA-UE wireless links. The RF isolation between the different directional antennas or the different beam directions should be large. In one example, the RF isolation Ri in dB, the gain G of the DWSA RF path and the desired SNR of the signal at the intended destination of the RF signal, which can be the CBS in the UL or the UEs in the DL, satisfy $Ri - G \geq SNR$.

At a first time period, a CBS beamforms with a first subset of multiple DWSAs, and through which to beamform with a set of UEs using PTB. Each or some of the DWSAs can include a RF repeater to repeat a RF signal on a part of the spectral band to another DWSA that is not in the Line of Sight (LoS) of the CBS so that a part of RF signal from CBS can reach a DWSA not in the LoS of the CBS. Then the CBS can perform pass-through beamforming with the UEs in the coverage area of the first subset of DWSAs through the first subset of DWSAs and with UEs in the coverage area of the non-LoS DWSA through the RF repeaters in the first subset of DWSAs and through the non-LoS DWSA. At a second time period, a CBS beamforms with a third subset of multiple DWSAs, and through which to beamform with a set of UEs using PTB. Each or some of these DWSAs can also include a RF repeater to repeat a RF signal on a part of the spectral band to another DWSA that is not in the Line of Sight (LoS) of the CBS so that a part of RF signal from CBS can reach a DWSA not in the LoS of the CBS. The CBS can then perform pass-through beamforming with the UEs in the coverage area of the second subset of DWSAs through the second subset of DWSAs and with UEs in the coverage area of the non-LoS DWSA through the RF repeaters in the second subset of DWSAs and through the non-LoS DWSA. A media access controller (MAC) in the CBS schedules the first and second subsets of UEs and the associated DWSAs, and the RF repeaters if any is present and needed, in the first and second time period to achieve PTB with the UEs.

In one embodiment, a DWSA further include UE detection circuits that listens to uplink (UL) signals from UEs and when a new UE is detected, the DWSA sends UL signal to the CBS to report to the CBS of the new UE. In another embodiment, a DWSA's receiver controls the DWSA-UE antenna to scan for UL signals from UEs. In yet another embodiment, a DWSA's transmits commands to control the DWSA-UE antenna to scan the range of coverage angles with broadcast and/or control messages and DWSA's receiver controls the DWSA-UE antenna to scan for UL signals from UEs. When one or more UEs under the coverage of one or more DWSAs have data to transmit or receive, the transmitters in the DWSAs are in work mode, steer their DL beams beamform to the UEs. When there is no data to be transmitted UEs in the DWSA's coverage, the DWSA's data transmission to UEs is in sleep or idol mode, or turned off to save power.

In another embodiment, a lower frequency band with better coverage and propagation property than mmWave, e.g., in sub-6 Ghz spectrum, is used for the CBS to communicate with and control the DWSAs under its coverage, including controlling the beam scanning and alignment of DWSAs to establish or maintain wireless links with UEs. The commands or signals on the lower frequency band are synchronized in time with the signals or events in the mmWave bands for the CBS-DWSA wireless links.

It is known in the art that analog RF signals can be directly modulated onto light waves and transmitted over optical fiber with low loss. However, transmitting high frequency analog RF signals over wires or cables does not work well because high frequency and wideband analog signals decay quickly over a wire or cable. One embodiment uses wires or cables, e.g., ethernet cables or coaxial cable, to transmit band-limited analog signals, e.g., bandwidth=20, 100 or 160 MHz, by transmitting the RF signal using a zero or low intermediate carrier frequency (IF) to avoid to the problem of fast decaying of wideband analog RF signals with high frequency carriers. This is referred to RF-over-wire-fronthaul (RW-fronthaul). In the DL, the CBS uses a digital-to-analog conversion DAC circuit to convert a digital baseband signal to a band-limited analog signal and transmits it over the wire or cable using a zero or low IF. A distributed smart antenna (wired in this case, referred to as DSA-W) or remote radio unit (RU) receives the band-limited analog signal over the RW-fronthaul, up-converts the signal to a carrier frequency, e.g., using a mixing driven by a local oscillator at the carrier frequency, and transmits the RF signal over the air. In the UL, a DSA-W receives a RF signal at a carrier frequency from the UEs, down-converts the RF signal to zero or low IF, transmits the resulting band-limited analog signal to a CBS over a wire or cable. The CBS receives the analog signal, down-converts the signal to baseband if necessary, and performs ADC to obtain the digital baseband signal for further processing in the physical and upper layers. A DSA-W or the RU consists primarily of one or more receiving amplifiers, a mixer, a local oscillator, one or more transmitting amplifiers, and filters if needed. It may also include synchronization circuits to synchronize the carrier frequency, and phase if necessary for cooperative beamforming or distributed MIMO, with other DSA-Ws or RUs. This embodiment allows the ADC, DAC and main radio signal circuits to be located with the CBS, and makes the spatially deployed DSA-Ws or RUs simpler compared to conventional RUs in a mobile network with a conventional digital IQ signal fronthaul where the ADC, DAC and all radio signal circuits are with the RUs. In addition to offering performance improvements and efficiency gains, simplifying the DSA-Ws or RUs reduces deployment and maintenance cost because they must be widely distributed spatially and mounted at substantial height.

In another embodiment, a central base station CBS capable of MU-MIMO in sub-6 GHz frequency range uses MU-MIMO beamforming to provide backhaul connection to customer premise equipment (CPEs) or small cell (SCs) which uses a directional high-gain, e.g., ≥20 dBi, antenna to establish the wireless link with the CBS. A CPE or SC can also use dual polarized directional high-gain antennas to provide either diversity or spatial multiplexity to establish two independent communications streams with the CBS. At a first time period, a CBS beamforms with a first subset of CPEs or SCs, each or some of which can include a RF repeater to repeat a RF signal on a part of the spectral band to another CPE or SC that is not in the Line of Sight (LoS) of the CBS so that a part of RF signal from CBS can reach a CPE or SC not in the LoS of the CBS. The CBS can then perform pass-through beamforming the non-LoS CEP or SC through one or more of the RF repeaters in the first subset of CPEs or SCs. At a second time period, a CBS beamforms with a second subset of CPEs or SCs, each or some of which can also include a RF repeater to repeat a RF signal on a part of the spectral band to another CPE or SC that is not in the Line of Sight (LoS) of the CBS so that a part of RF signal from CBS can reach a CPE or SC not in the LoS of the CBS. The CBS can then perform pass-through beamforming the non-LoS CEP or SC through one or more of the RF repeaters in the second subset of CPEs or SCs. A media access controller (MAC) in the CBS schedules the first and second subsets of CPEs or SCs in the first and second time period, and the RF repeaters and non-LoS CPEs or SCs for PTB.

One embodiment of this invention is an EmmCPE comprising a local mmCPE that provides services to the UEs within the local CP; a Forward Processing Equipment (FPE) that offers services to other apparatuses, UEs, mmCPEs or EmmCPE under its coverage; and a controller that routes part of data to or from the local mmCPE and routes the other part of data to or from the FPE under the control of a BS.

Figure 2:
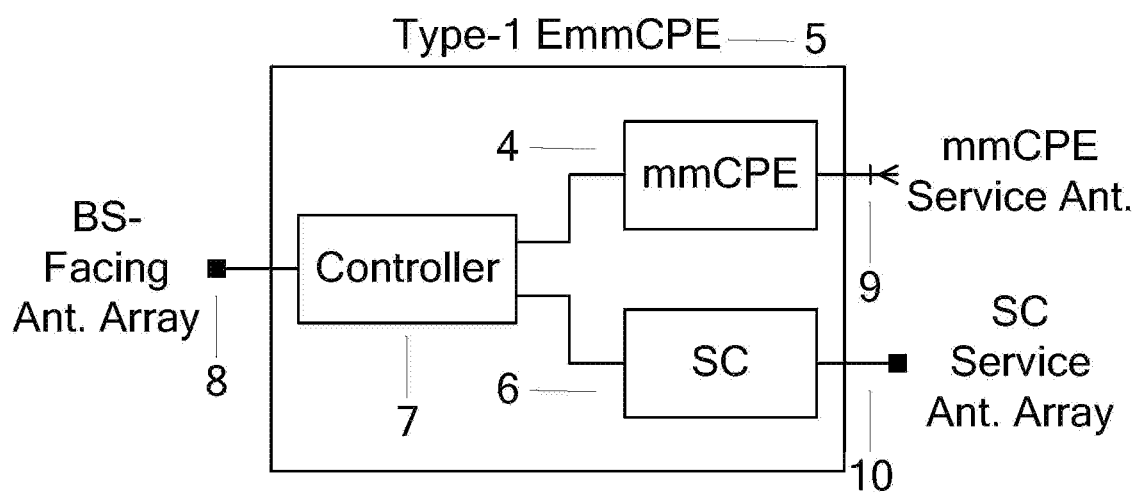
FIG. 2 shows an example of a Type-1 EmmCPE including a local mmCPE, a small cell, a controller, a BS-facing antenna array, a mmCPE service antenna, and a small cell service antenna array.

In one embodiment, a Type-1 EmmCPE uses a Small Cell (SC) as its FPE, where the local mmCPE and the SC share one or more BS-facing antenna arrays to communicate with the BS in a mmWave frequency band; the local mmCPE employs one or more antenna or antenna arrays to offer service for the local CP in the same or a different frequency band; the SC employs one or more antenna arrays to serve other apparatuses, UEs, mmCPEs or EmmCPEs under its coverage in the same or a different mmWave band; the BS provides a mmWave backhaul link to the local mmCPE and also provides a mmWave backhaul link to the SC using different time slots, different frequency resources, or different pairs of antenna arrays; and the SC determines the steering or switching of beams to serve other apparatus, UEs, mmCPEs or EmmCPEs under its coverage. FIG. 2 illustrates an example of a Type-1 EmmCPE 5 including a local mmCPE 4, a SC 6, a controller 7, a BS-facing antenna array 8, a mmCPE service antenna 9, and a SC service antenna array 10. In this example, the local mmCPE and the SC share the BS-facing antenna to communicate with the BS in a mmWave frequency band, the SC uses its service antenna array to serve other apparatus, UEs, mmCPEs or EmmCPEs under its coverage in the same or a different mmWave band, and the local mmCPE uses its service antenna to serve the local CP in a sub 6 GHz frequency band.

Figure 3:
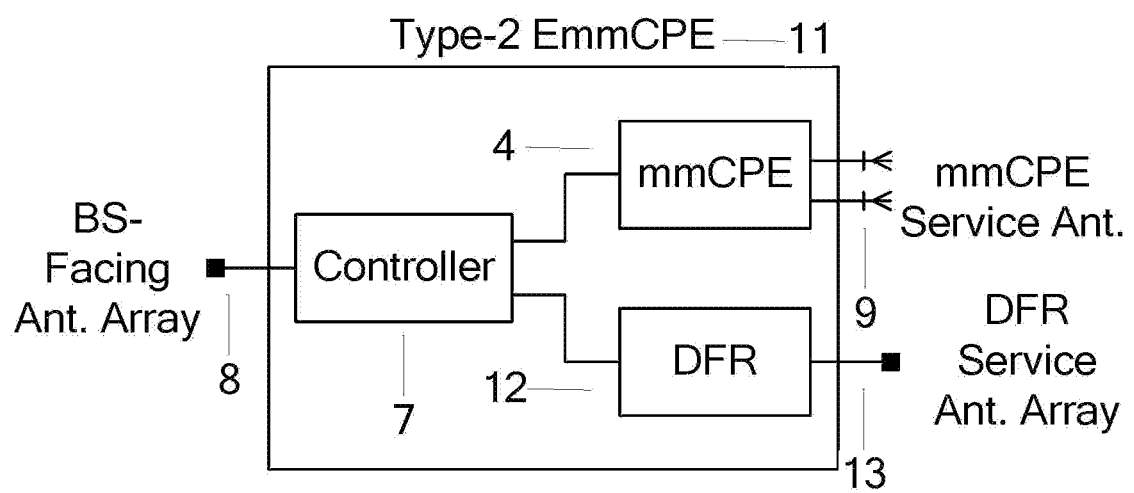
FIG. 3 shows an example of a Type-2 EmmCPE including a local mmCPE, a decode-and-forward repeater, a controller, a BS-facing antenna arrays, two mmCPE service antennas, and a repeater service antenna array.

In another embodiment, a Type-2 EmmCPE uses a Decode-and-Forward Repeater (DFR) as its FPE, where the local mmCPE and the DFR share one or more BS-facing antenna arrays to communicate with the BS in a mmWave frequency band; the local mmCPE employs one or more antenna or antenna arrays to offer service for the local CP in the same or a different frequency band; the DFR employs one or more antenna arrays to serve other apparatuses, UEs, mmCPEs or EmmCPEs under its coverage in the same mmWave band; the BS provides a mmWave backhaul link to the local mmCPE and also provides a mmWave donor link to the DFR using different time slots, different frequency resources, or different pairs of antenna arrays; and the DFR steers or switches one or more beams to one or more directions selected by the BS to serve other apparatus, UEs, mmCPEs or EmmCPEs under its coverage. FIG. 3 illustrates an example of a Type-2 EmmCPE 11 including a local mmCPE 4, a DFR 12, a controller 7, a BS-facing antenna array 8, two mmCPE service antennas 9, and a DFR service antenna array 13. In this example, the local mmCPE and the DFR share the BS-facing antenna to communicate with the BS in a mmWave frequency band, the DFR uses its service antenna array to serve other apparatus, UEs, mmCPEs or EmmCPEs under its coverage in the same mmWave band, and the local mmCPE uses two service antennas to serve the local CP in a sub frequency 6 GHz band.

Figure 4:
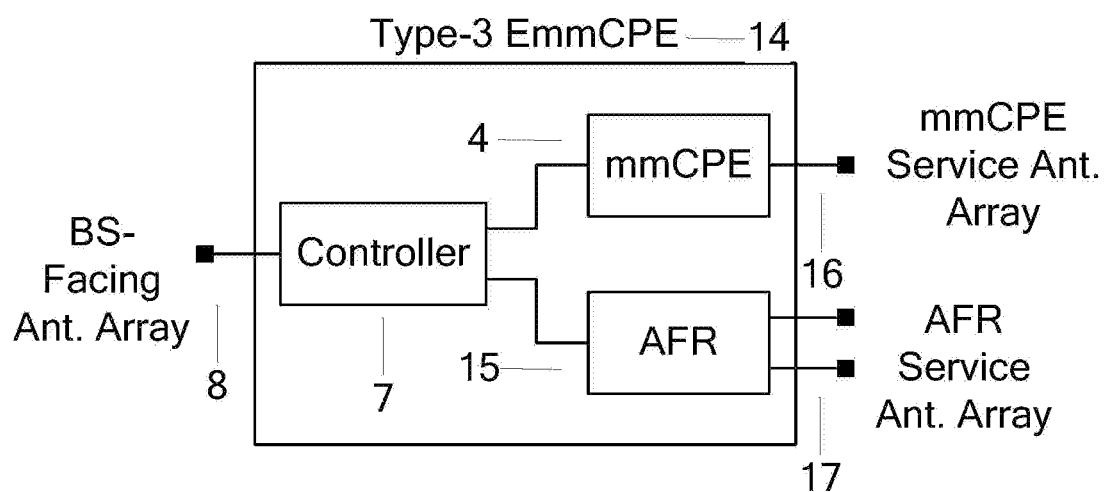
FIG. 4 shows an example of a Type-3 EmmCPE including a local mmCPE, an amplify-and-forward repeater, a controller, two BS-facing antenna arrays, one mmCPE service antenna array, and two repeater service antenna arrays.

In another embodiment, a Type-3 EmmCPE uses an Amplify-and-Forward Repeater (AFR) as its FPE, where the local mmCPE and the AFR share one or more BS-facing antenna arrays to communicate with the BS in a mmWave frequency band; the local mmCPE employs one or more antenna or antenna arrays to offer service for the local CP in the same or a different frequency band; the AFR employs one or more antenna arrays to serve other apparatuses, UEs, mmCPEs or EmmCPEs under its coverage in the same mmWave band; the BS provides a mmWave backhaul link to the local mmCPE and also provides a mmWave donor link to the AFR using different time slots, different frequency resources, or different pairs of antenna arrays; and the AFR steers or switches one or more beams to one or more directions selected by the BS to serve other apparatus, UEs, mmCPEs or EmmCPEs under its coverage. FIG. 4 illustrates an example of a Type-3 EmmCPE 14 including a local mmCPE 4, an AFR 15, a controller 7, two BS-facing antenna arrays 8, one mmCPE service antenna arrays 16, and two AFR service antenna arrays 17. In this example, the local mmCPE and the AFR share two BS-facing antennas to communicate with the BS in a mmWave frequency band, the AFR uses two service antenna arrays to serve other apparatus, UEs, mmCPEs or EmmCPEs under its coverage in the same mmWave band, and the local mmCPE uses its antenna array to serve the local CP in the same or a different mmWave band.

Figure 5:
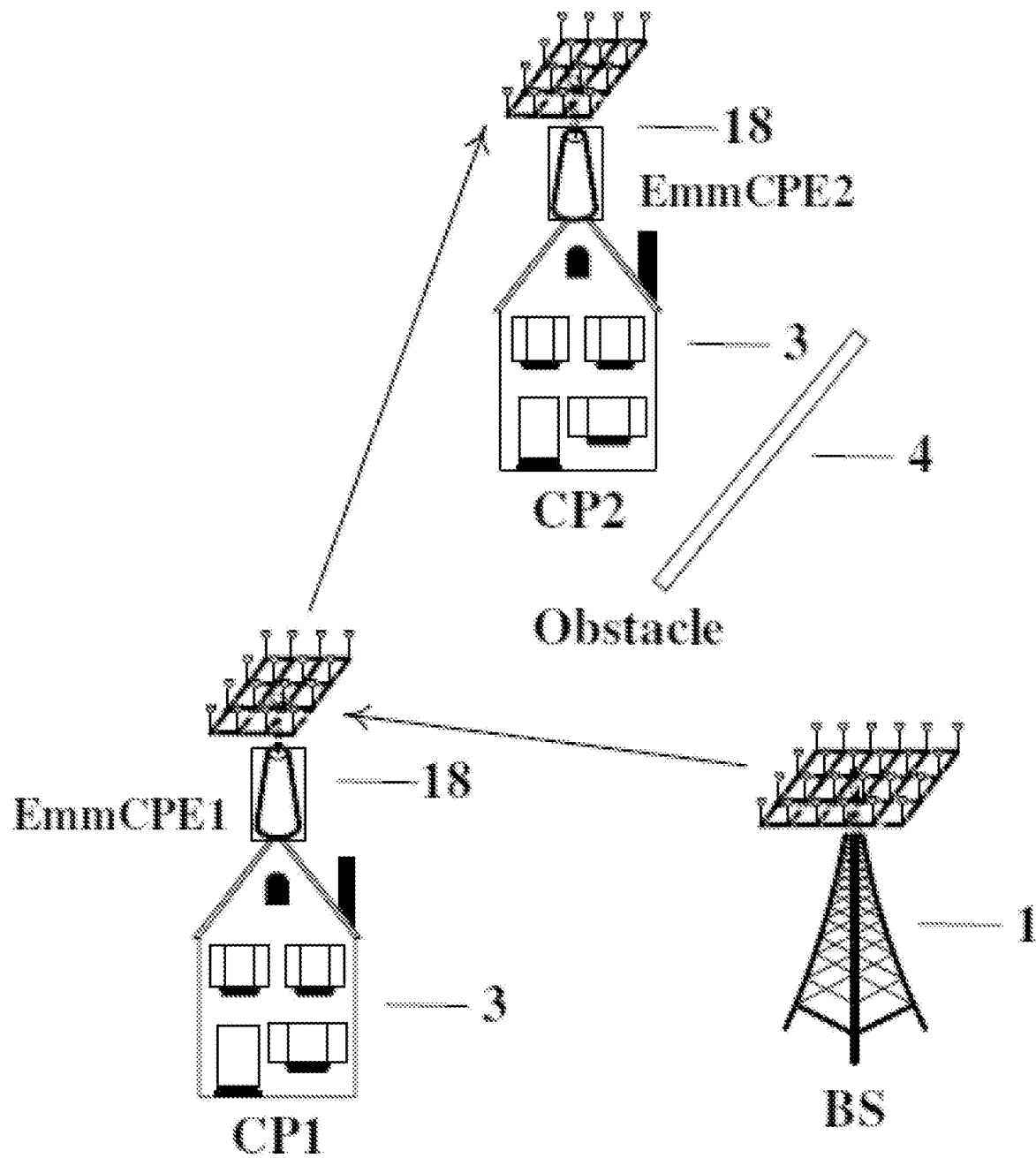
FIG. 5 shows a simple example in which one mmWave BS serves a first EmmCPE for one CP in its LoS coverage while serves a second EmmCPE for another CP out of its LoS coverage blocked by one obstacle through the first EmmCPE.

Another embodiment of this invention is a mmWave wireless communication system in which a BS provides mmWave backhaul links to multiple mmCPEs, where an apparatus, UE, or mmCPE or EmmCPEs within the LoS coverage of the BS is directly served by the BS in one set of time-frequency-spatial resources, while an apparatus, UE, or mmCPE or EmmCPEs out of the LoS coverage of the BS is served by another EmmCPE within or out of the LoS coverage of the BS in another set of time-frequency-spatial resources. For an EmmCPE, the time-frequency-spatial resources allocated to the local mmCPE to serve the local CP and allocated to the FPE to server one or multiple other apparatuses, UEs, mmCPEs or EmmCPEs can be predefined or adaptively controlled by the BS through the BS sending control message to the EmmCPE. FIG. 5 illustrates a simple example in which one mmWave BS serves one first EmmCPE 18 for one CP in its LoS coverage while serves another second EmmCPE for another CP out of its LoS coverage blocked by one obstacle through the first EmmCPE. In this example, the BS serves CP1 in its LoS coverage area through EmmCPE1 using one set of time-frequency-spatial resources, while serves CP2 out of its LoS coverage area through EmmCPE1 and EmmCPE2 where EmmCPE2 is in the coverage area of EmmCPE1 using another set of time-frequency-spatial resources. Compared to the example in FIG. 1, by replacing the mmCPE with the EmmCPE, the coverage area of the BS is enlarged, and CP2 that cannot be served using the mmCPE now can be served by employing the EmmCPE. In addition, more CPs out of the LoS coverage area of the BS but in the coverage area of EmmCPE1 could be served by the BS through EmmCPE1 and more CPs out of the LoS coverage area of the BS but in the coverage of EmmCPE2 could be served by the BS through EmmCPE1 and EmmCPE2.

In one embodiment, the Type-1 EmmCPE that includes a SC operating in different time-frequency-spatial resources from the local mmCPE is used to serve one or more other apparatuses, UEs, mmCPEs or EmmCPEs under its coverage area.

In another embodiment, the Type-2 EmmCPE that includes a DFR operating in different time-frequency-spatial resources from the local mmCPE is used to serve one or more other apparatuses, UEs, mmCPEs or EmmCPEs.

In another embodiment, the Type-3 EmmCPE that includes an AFR operating in different time-frequency-spatial resources from the local mmCPE is used to serve one or more other apparatuses, UEs, mmCPEs or EmmCPEs, where the received signal at the AFR should be high enough to prevent amplifying the noise level.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. An enhanced millimeter wave (mmWave) Customer Premise Equipment (EmmCPE) comprising
   one or more Base Station (BS) facing antennas (BS-facing antennas) and RF processing circuits to establish a network connection via one or more mmWave wireless links with one or more Base Station (BS);
   a local mmWave Customer Premise Equipment module (mmCPE) that uses part of the one or more mmWave wireless links with the one or more Base Station (BS) to provide network services to one or more user equipment (UEs) within the local customer premise where the mmCPE is located;
   a Forward Processing Equipment module (FPE) that uses one or more antennas and RF processing circuits to direct one or more mmWave beams to establish mmWave wireless links with other mmCPE(s) or EmmCPE(s) not located at the local customer premise and uses another part of the one or more mmWave wireless links with the one or more Base Station (BS) to provide network connection to the other mmCPE(s) or EmmCPE(s) not located at the local customer premise, and, a Controller that routes some of the data from the one or more BS to the local mmCPE and some of the data from the one or more BS to the FPE, routes the data from the local UEs via the local mmCPE to the one or more BS, and routes the data from the other mmCPE(s) or EmmCPE(s) not located at the local customer premise via the FPE to the one or more BS, wherein the routing of the data is by the Controller is controlled by the one or more BS.

2. The EmmCPE of claim 1 wherein the local mmCPE uses a frequency band that is below 6 GHz to serve UEs in the local customer premise.

3. The EmmCPE of claim 1 wherein the local FPE is a Small Cell (SC) of a mobile network, wherein the backhaul of the SC is provided by the network connection to the one or more BS and the mmWave wireless link between the one or more BS and the EmmCPE that is shared by the local mmCPE.

4. The EmmCPE of claim 3 wherein the SC operates using different time, frequency, or spatial resources than the local mmCPE.

5. The EmmCPE of claim 1 wherein the local FPE is a Decode-and-Forward Repeater (DFR) which steers or switches one or more beams to one or more directions selected by the one or more BS to serve one or more mmCPE(s) or EmmCPE(s) not located at the local customer premise.

6. The EmmCPE of claim 5 wherein the Decode-and-Forward Repeater (DFR) operates using different time, frequency, or spatial resources than the local mmCPE.

7. The EmmCPE of claim 1 wherein the local FPE is an Amplify-and-Forward Repeater (AFR) which steers or switches one or more beams to one or more directions selected by the one or more BS to serve one or more mmCPE(s) or EmmCPE(s) not located at the local customer premise.

8. The EmmCPE of claim 7 wherein the Amplify-and-Forward Repeater (AFR) operates using different time, frequency, spatial resources than the local mmCPE.

9. A mmWave wireless communication system comprising,
a BS providing mmWave wireless links to one or more EmmCPE(s) and one or more UE(s) or mmCPE(s) within the Line of Sight (LoS) coverage of the BS using a set of time, frequency and spatial resources; and,
one or more EmmCPE(s) that are within the LoS coverage of the BS and establish mmWave wireless link with the BS providing wireless network services to UE(s), mmCPE(s) or EmmCPEs outside the LoS coverage of the BS,
wherein each of the one or more EmmCPE comprises:
one or more Base Station (BS) facing antennas (BS-facing antennas) and RF processing circuits to establish a network connection via one or more mmWave wireless links with one or more Base Station (BS);
a local mmWave Customer Premise Equipment module (mmCPE) that uses part of the one or more mmWave wireless links with the one or more Base Station (BS) to provide network services to one or more user equipment (UEs) within the local customer premise where the mmCPE is located;
a Forward Processing Equipment module (FPE) that uses one or more antennas and RF processing circuits to direct one or more mmWave beams to establish mmWave wireless links with other mmCPE(s) or EmmCPE(s) not located at the local customer premise and uses another part of the one or more mmWave wireless links with the one or more Base Station (BS) to provide network connection to the other mmCPE(s) or EmmCPE(s) not located at the local customer premise; and,
a Controller that routes some of the data from the one or more BS to the local mmCPE and some of the data from the one or more BS to the FPE, routes the data from the local UEs via the local mmCPE to the one or more BS, and routes the data from the other mmCPE(s) or EmmCPE(s) not located at the local customer premise via the FPE to the one or more BS, wherein the routing of the data is by the Controller is controlled by the one or more BS.

10. The mmWave wireless communication system of claim 9 wherein the BS sends control messages to an EmmCPE to adaptively allocates time, frequency and spatial resources to the local mmCPE and to the FPE to serve the LPs, mmCPEs or EmmCPEs not in the Line of Sight (LoS) coverage of the BS.

11. The mmWave wireless communication system of claim 9 wherein the local mmCPE of an EmmCPE uses a frequency band that is below 6 GHz to serve UEs in the local customer premise.

12. The mmWave wireless communication system of claim 9 wherein the local FPE of an EmmCPE is a Small Cell (SC) of a mobile network, wherein the backhaul of the SC is provided by the network connection to the BS and the mmWave wireless link between the BS and the EmmCPE that is shared by the local mmCPE.

13. The mmWave wireless communication system of claim 12 wherein the SC operates using different time, frequency, or spatial resources than the local mmCPE.

14. The mmWave wireless communication system of claim 9 wherein the local FPE of an EmmCPE is a Decode-and-Forward Repeater (DFR) which steers or switches one or more beams to one or more directions selected by the BS to serve one or more mmCPE(s) or EmmCPE(s) not located at the local customer premise.

15. The mmWave wireless communication system of claim 14 wherein the Decode-and-Forward Repeater (DFR) operates using different time, frequency, or spatial resources than the local mmCPE.

16. The mmWave wireless communication system of claim 9 wherein the local FPE of an EmmCPE is an Amplify-and-Forward Repeater (AFR) which steers or switches one or more beams to one or more directions selected by the one or more BS to serve one or more mmCPE(s) or EmmCPE(s) not located at the local customer premise.

17. The mmWave wireless communication system of claim 16 wherein the Amplify-and-Forward Repeater (AFR) operates using different time, frequency, or spatial resources than the local mmCPE.

* * * * *